Sept. 2, 1969  J. J. MEYER  3,464,802
JOINT FOR JOINING CLAD MATERIALS
Original Filed Aug. 3, 1966  2 Sheets-Sheet 1

INVENTOR:
JOHN J. MEYER

Sept. 2, 1969   J. J. MEYER   3,464,802
JOINT FOR JOINING CLAD MATERIALS
Original Filed Aug 3, 1966   2 Sheets-Sheet 2

United States Patent Office 3,464,802
Patented Sept. 2, 1969

3,464,802
JOINT FOR JOINING CLAD MATERIALS
John J. Meyer, Rock Hill, Mo., assignor to Nooter Corporation, St. Louis, Mo., a corporation of Missouri
Original application Aug. 3, 1966, Ser. No. 574,880. Divided and this application Jan. 22, 1969, Ser. No. 793,127
Int. Cl. B23k 33/00
U.S. Cl. 29—183.5                                     9 Claims

ABSTRACT OF THE DISCLOSURE

A joint for joining pieces of clad material in edgewise abutting relation along a vertical edge, said clad material having a top layer of superior corrosion resistant material and an intermediate layer of high heat conducting material and a base metal, the base metal portions joined together by a conventional weld, said top layers and intermediate layers of opposite pieces being cut back to form a gap therebetween, said gap having fill material therein beyond said vertical edges and a weld strip extending over and beyond said fill material and over a portion of said top layer, said weld strip being welded at its edges to said top layer.

---

This application is a division of my copending application Ser No. 574,880 filed Aug. 3, 1966.

This invention relates to an improved joint for joining clad material, and in particular, to a joint for joining material clad with an outside layer of material which has superior resistance to corrosion, such as tantalum.

Clad materials are generally old and are used with increasing frequency in modern equipment which requires great resistance to corrosion. Clad materials and their method of manufacture are disclosed in prior patents, such as Cowan et al., Patent No. 3,233,312 granted Feb. 8, 1966. These clad materials present one set of problems in their manufacture into flat sheets, and present additional problems when the flat sheets are fabricated into vessels, containers, shells, heads, nozzles, pipes or other shapes which are used in industry. For example, tantalum has superior resistance to corrosion, but it is very expensive. Tantalum also has a high melting point compared to steel, which is usually used as a base metal. Frequently a chemical processer will desire a vessel whose exposed internal surface is made entirely from tantalum. This requires tantalum clad material to be rolled or bent, cut, and welded in order to fabricate the vessel with a tubular or cylindrical surface and suitable heads or end portions.

One of the principle objects of the present invention is to provide a joint for joining clad material having a top layer of tantalum whose thickness is of the order of about .030 inch minimum. Another object is to join clad material in edgewise abutting relation without destroying the properties of the expensive top layer material during the joining process. Another object is to join tantalum clad material by providing a layer between the tantalum and the steel base material, said layer having good heat transfer properties. Another object is to provide a novel joint or weld between two pieces of clad material welded in edgewise abutting relation.

These and other objects and advantages will become apparent hereinafter.

The invention is embodied in a joint for joining clad material in edgewise abutting relation, said clad material having a top layer of super corrosion resistant material of about at least .030 inch thickness, an intermediate copper layer of between about .050 and .070 inch thick, and tantalum weld strip extending inwardly from the fill between the top layer and copper layer a distance of at least .25 inch.

The invention further consists in the joint or weld made. In the accompanying drawings which form part of this specification and wherein like numerals and like letters refer to like parts wherever they occur:

This invention is embodied in the joint shown substantially in the accompanying drawings. As used herein, the clad material may be any material having a suitable base, such as steel, and a suitable super corrosive resistant layer made from a material such as tantalum, although it is possible that columbium, tungsten and molybdenum may be used if desired. The melting point of tantalum is about 5425° F. The melting point of a typical base, such as steel, is about 2750° F. Any attempt to weld tantalum clad material reqires so much heat to effect the welding of the tantalum that the steel base metal melts and absorbs the tantalum. This is objectionable and reduces the effectiveness of the already thin tantalum layer.

The present joint for joining clad material utilizes a copper layer about .060 inch between the tantalum and the steel base. The thickness of this copper layer is critical and should be maintained between .050 and .070 inch. If the copper layer is too thin, it melts due to the heat required to weld the tantalum weld strip to the top layer of tantalum. If the copper is too thick, it pulls so much heat away from the tantalum weld strip so that it cannot be welded properly. The thickness of the steel base material is not critical and is determined by the strength desired and pressures within the vessel. The use of the copper layer spreads the heat over a large surface and prevents the steel from melting at a point near the tantalum layer. Without the copper layer between the tantalum and the steel base, such as when the tantalum is in direct contact with the steel base, the tantalum cannot be welded without destroying its physical and corrosion resistant properties, because the high heat required to weld or melt the tantalum causes the adjacent area of the steel base to melt first. By the time that enough heat is supplied to the tantalum, the steel has become molten. When tht tantalum also becomes molten, there is molten tantalum on the molten steel, and the molten steel may then erupt through the tantalum thereby destroying the desired physical properties of the clad material.

Figure 1:
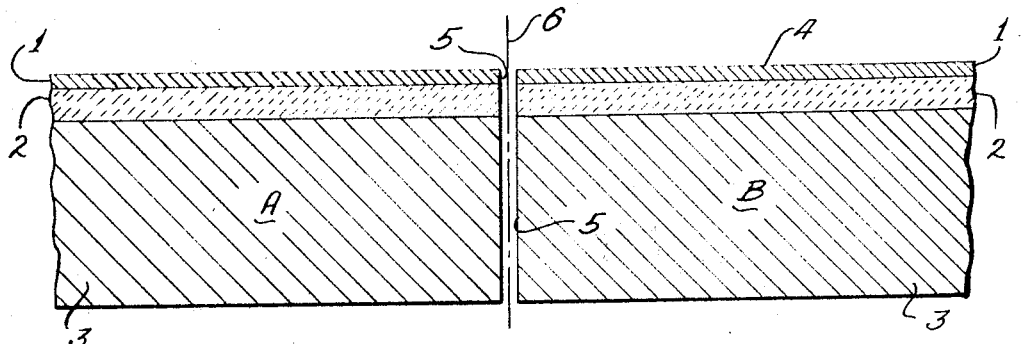
FIG. 1 is a sectional view of two pieces of clad material before they are joined together.
Figure 2:
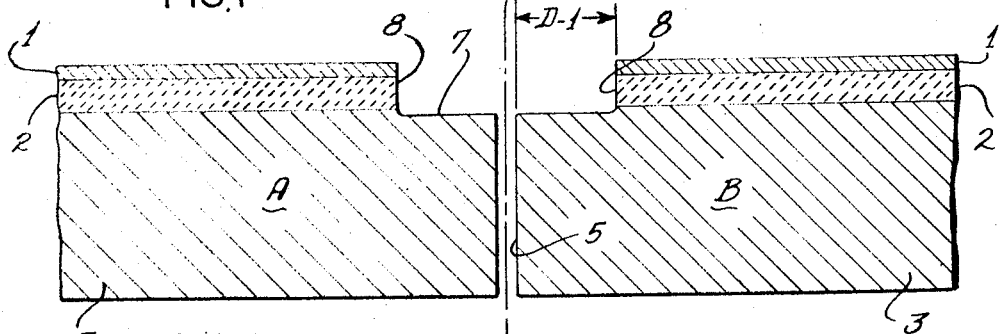
FIG. 2 is a cross-sectional view of said pieces after their top layers and intermediate layers have been cut back.

As shown in FIG. 1, the object of this invention is to join pieces A and B together in edgewise abutting relation with only the top layer material being exposed to the corrosive substance and without destroying the bond or mix between the top layer and the layer therebelow of the pieces A and B. Any attempt to weld pieces A and B together in one pass, either with or without an intermediate layer such as copper, would result in an unsatisfactory finished product because of the differences in melting points of the clad material. For example, the melting points of metals are substantially as follows: tantalum 5425° F., steel 2753° F., cooper 1981° F., and silver 1760° F.

Referring to FIG. 1, each piece A and B has a top layer 1, an intermediate layer 2, and a base metal 3. Each top layer 1 has a top surface 4. Each piece A and B has a vertical edge 5. A center line 6 is shown therebetween for reference purposes. The pieces A and B have their edges properly fitted or cut for joining purposes, as shown in FIG. 1. The first step of the present process comprises cutting back the top layer 1 and the intermediate layer 2 from the vertical edges 5 of the pieces A and B. This cutting back may be done by machining with an edge planer, or by grinding, or by peeling said layers 1 and 2 away from the steel base 3 after a notch has been made in each piece along a line parallel to the edge 5, said notch extending downwardly through layers 1 and 2 and slightly into layer 3. The cutting goes slightly deeper than the thickness of the top layer 1 and intermediate layer 2 so that an upper surface 7 of the steel base metal is exposed which has no portions of the material of the intermediate layer 2 therein. A new upright edge 8 is formed for the top layer 1, the intermediate layer 2, and the upper portion of the base metal 3. This edge 8 is cut back from edge 5 a distance D-1, which is at least 0.25 inch. The bottom of the edge 5 in the base metal 3 is provided with a small radius. A sharp corner is to be avoided here.

Figure 3:
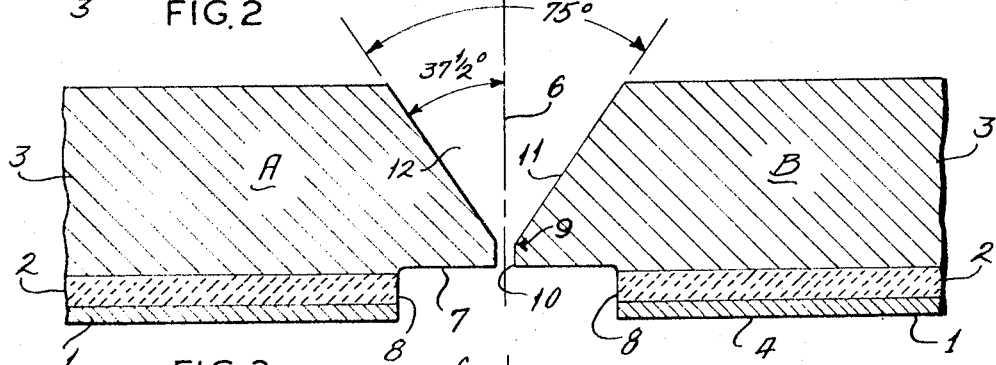
FIGS. 3 and 4 are cross-sectional views after the steel base metal of said two pieces have been notched out and welded together by a conventional weld.

The steel base metal 3 is then welded together by conventional means. As shown in FIG. 3, wherein the pieces A and B have been turned upside down, the steel base 3 is notched out at a 75° angle from a point 9 slightly below the top surface 7 of the base metal 3. This forms a land 10, which is part of the original vertical edge 5, on each piece A and B, and a diverging wall 11 which diverges from a vertical line 6 at about 37.5°. The land 10 which is used for fitting purposes to fit the pieces A and B together is part of the edge 5. The notching may be done by an edge planer or the material may be burned or flame cut, or ground off. The conventional manner of notching is used and this is a choice of the welder and may be determined by the availability of equipment. Tht space between the lands 10 and sloping walls 11 forms the notch 12 which is made to receive a conventional weld 13.

Figure 4:
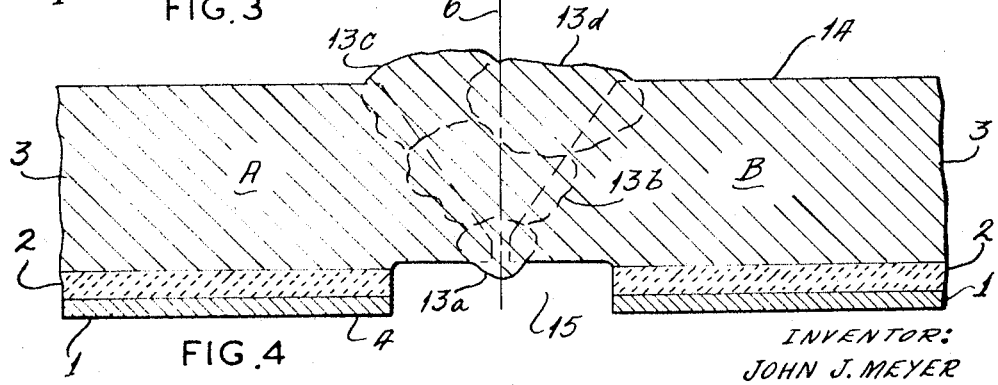

As shown in FIG. 4, the pieces A and B are then welded together in the conventional manner by bringing the lands 10 together with a gap of about 3/32 to 1/8 inch therebetween and tacking every 6 or 12 inches to hold the pieces A and B in fixed relation, and then making the conventional weld 13 in one or more passes. Four passes are shown in FIG. 4 for illustration purposes. The first pass 13a initially results in a slight bead above the top surface 7 of the pieces A and B. Additional passes 13b, 13c, and 13d are made to fill the notch 12. The bead of pass 13a is then made flush with said top surface 7 by grinding or by wire brushing. The bead or beads at the bottom 14 of the base metal 3 formed by passes 13c and 13d need not be ground off flush with said bottom 14 unless such is desired.

Figure 5:
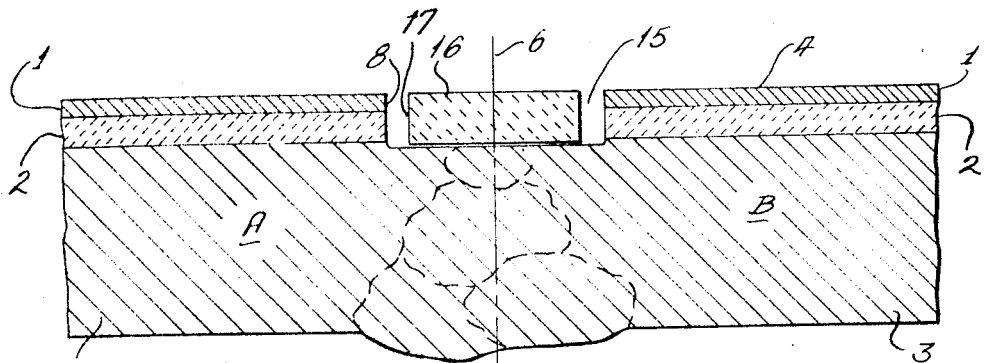
FIG. 5 is a cross-sectional view of said pieces after a fill strip has been inserted in the gap between the top layers and intermediate layers and above the conventional weld.
Figure 6:
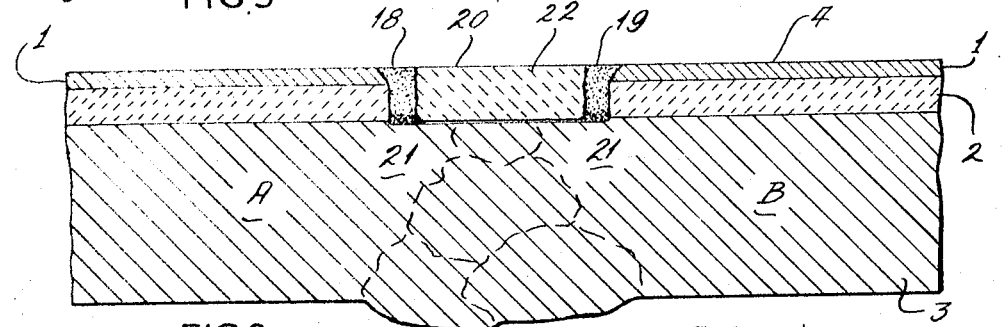
FIG. 6 is a cross-sectional view as in FIG. 5 with the fill strip welded in the gap.

As shown in FIGS. 4 and 5, the tri-clad pieces A and B are now joined along the base metal 3 only, leaving a gap 15 between the top layer 1, intermediate layer 2, and part of the base metal 3 of the pieces A and B. This gap 15 is slightly deeper than the combined thicknesses of said layers 1 and 2. The gap 15 may be filled with silver weld metal when such items as nozzles or pipes are being formed or where the width of the gap 15 is not uniform due to any misalignment of pieces A and B. However, depending upon the size of the gap 15, the use of a silver fill might be prohibitively expensive. When pieces A and B for segments of cylindrical shells and/or when there is no alignment problem, a copper strip 16 is positioned in the gap 15 with its edges 17 about 1/8 inch from each edge 8 of the top layer 1 and intermediate layer 2. Two silver welds 18 and 19 are then made along the edges 17 of said copper strip 16 to completely fill and 1/8 inch spaces and the gap 15. The silver welds 18 and 19 and top 20 of the copper strip 16 are then smoothed and made flush with the top surfaces 4 by grinding or wire brushing. An undisturbed region 21 exists within each base metal 3 inwardly from the position of the lands 10 and below the welds 18 and 19 (to prevent the heat used in making the welds 18 and 19 from damaging the conventional weld 13). This gives the structure shown in FIG. 6, which is now ready to receive a weld strip made from the same material as the top layers 1. The copper strip 16 and welds 18 and 19 form a fill 22 which completely fills the gap 15.

Before the weld strip 23 is applied, a purge hole 24 is drilled through the conventional weld 13 and the fill 16, and a similar hole is drilled through the weld 13 and fill 16 at a suitable distance from the hole 24. These holes are common practice and are used to protect the underside of the weld strip 23 as it is being welded to the top layers 1 of pieces A and B. That is, assuming the pieces A and B are cylindrical segments being joined together so that the top layer 1 forms the inner surface of a tank and the base metal 3 forms the outer surface of a tank, a circular weld strip 23 of the proper width, that is, at least 1/2 inch greater than the fill 22 or distance between the edges 8, is placed over the fill 22 and masking tape is used to seal the edges 25 of the weld strip 23. Suitable gas is directed through the purge hole 24, which gas moves between the weld strip 23 and the metal therebelow, to prevent air from oxidizing and contaminating the adjacent surfaces of the weld strip 23 and the top layers 1. This gas protects the underside of the weld strip 23 as its edges 25 are being welded. The sealing or masking tape is removed just prior to the welding of the edges 25 of the weld strip 23. When the weld strip 23 has been completely welded to the top layers 1 of pieces A and B, the purge holes 24 may be used to test the welds. This testing may be by conventional means, such as as with a soapy solution, or by inserting helium in the weep hole and sniffing with a helium mass spectrometer, or by using a dye penetrant test.

Figure 7:
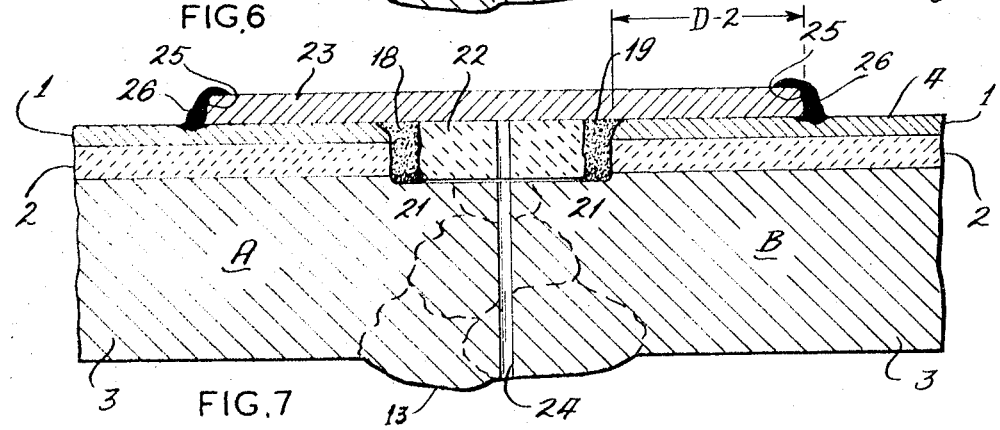
FIG. 7 is the final product showing the joined clad metal with an uninterrupted top portion completely covered by tantalum after the tantalum weld strip is welded thereto.
Figure 8:
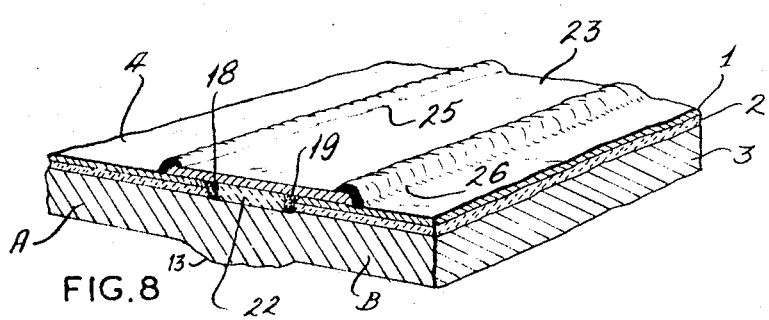
FIG. 8 is a fragmentary perspective view of the joint after it has been formed.

To weld the weld strip 23 in position, as shown in FIG. 7, the top surfaces 4 of the top layers 1 of pieces A and B are wire brushed and cleaned with a suitable solvent, such as alcohol. The tantalum weld strip 23 may then be applied. This strip 23 should be at least about .060 inches thick and should extend beyond the silver welds 18 and 19 or the edges 8 of the top layers 1 and intermediate layers 2 a distance D-2, which is at least 1/4 inch. That is, the strip 23 should be at least 1/2 inch wider than the width of the fill 22. This is critical, since the edges 25 of the strip 23 are welded to the top layers 1 at the points 26. If these points 26 are too close to the fill 22, the heat from the welding may disrupt the desired characteristics of the top layer 1, the intermediate layer 2, or the welds 18, 19 or 13 previously formed. If the tantalum weld strip 23 is not .060 inches thick, but is thinner, the edges 25 thereof should be turned up slightly to form a flange or a thicker edge portion for welding purposes.

The end result, as shown in FIG. 7, is a weld having only the top layer material exposed to the highly corrosive contents of the fabricated piece. This method of joining pieces A and B has not disrupted the metal characteristics between the layers of the clad material. There would be contamination of layers if there were only a top layer 1 of tantalum clad directly to the base metal 3, since the high heat necessary to weld the tantalum, which has a melting point of 5425° F., would melt the steel whose melting point is 2753° F. and would cause the tantalum and steel to intermix. This would result in a thickness of pure tantalum which would be too small to meet the specifications. Adding a thicker layer of tantalum to offset or compensate for any contamination at the point where the tantalum and base metal are joined would be uneconomical because of the high cost of tantalum. By providing an intermediate layer of copper of critical thickness, between about 0.050 and 0.070 inches, preferably about 0.060 inches, when the edges of the tantalum weld strip 21 are welded to the top layers 1, the intermediate copper layer 2 transmits the heat immediately and spreads it uniformly over a large area so that no contamination takes place between the top layer 1 and the intermediate layer 2, or between the intermediate layer 2 and the base metal 3.

The super corrosive resistant material used as the top layer 1 has been identified as tantalum. It is possible that other materials might also be used for the top layer 1, in which case the weld strip 23 should be made from the same material as the top layer material. That is, if molybdenum should be satisfactory as the top layer 1, then the weld strip 23 should be molybdenum.

This invention is intended to cover all changes and modifications of the examples of the invention herein chosen for purposes of the disclosure, which do not constitute departures from the spirit and scope of the invention.

What is claimed is:

1. A joint which joins pieces of clad material together in edgewise abutting relation along a vertical edge, said pieces of clad material each having a top layer of superior corrosion resistant material at least .030 inches thick and an intermediate layer of material between .050 and .070 inches thick and a base metal, said pieces having their base metal portions joined together along said vertical edge by a conventional weld between the base metal portions, said weld being narrow adjacent to said intermediate layer and relatively wide at a point remote from said intermediate layer, said top layers and intermediate layers of opposite pieces being cut back from said vertical edge thereby forming a gap between the edges of said top layers and said intermediate layers of opopsite pieces, said gap being positioned adjacent to said weld between said base metal, fill material positioned within said gap and being positioned directly above said conventional weld, said fill material extending at least .25 inches in each direction from said vertical edge, a zone in each base metal made of base metal and positioned between the conventional weld and the point where said fill contacts the top layer and intermediate layer, and a weld strip at least .060 inches thick and extending at least .25 inches beyond said fill material over said top layer, said weld strip being welded only at its edges to said top layer, said weld strip being made from the same material as said top layer.

2. The joint set forth in claim 1 wherein said intermediate layer is copper.

3. The joint set forth in claim 1 wherein the top layer is a metal selected from the group of tantalum, columbium, tungsten, and molybdenum.

4. The joint set forth in claim 1 wherein the top layer, the intermediate layer, and the uppermost part of the base metal are cut back from the vertical edge of each piece, so that only pure base metal is exposed below the cut-back portion which forms part of the gap which is to be filled.

5. The joint set forth in claim 4 wherein the top layer, the intermediate layer, and the uppermost part of the base metal are cut back at least a distance of .25 inches from the vertical edge of each piece.

6. The joint set forth in claim 1 wherein the top layer is tantalum.

7. The joint set forth in claim 6 wherein the tantalum is about 0.030 inches thick.

8. The joint set forth in claim 1 wherein the gap is filled with a strip whose edges are spaced about ⅛ inch from the upright walls of said gap and the two resulting ⅛ inch spaces are each filled with a weld, the bottom of said weld being spaced from said conventional weld by a portion of base metal in each of said pieces.

9. The joint set forth in claim 8 wherein the conventional weld is narrowest at a point adjacent to the fill and the gap extends laterally beyond said conventional weld at the gap, said base metal having an inner buffer region positioned between the ends of the gap and said conventional weld, the ends of the gap being welded with the inner buffer region separating said weld in said gap from said conventional weld.

References Cited

UNITED STATES PATENTS

| | | | |
|---|---|---|---|
| 2,547,947 | 4/1951 | Kleis et al. | 29—196.3 X |
| 3,120,702 | 2/1964 | Smith | 29—196.3 X |
| 3,188,720 | 6/1965 | Husni | 29—198 X |
| 3,233,312 | 2/1966 | Cowan et al. | 29—194 |
| 3,426,420 | 2/1969 | Grant et al. | 29—198 X |

L. DEWAYNE RUTLEDGE, Primary Examiner

E. L. WEISE, Assistant Examiner

U.S. Cl. X.R.

29—191, 194, 196.3, 198